(12) United States Patent
Choi et al.

(10) Patent No.: US 10,684,678 B1
(45) Date of Patent: Jun. 16, 2020

(54) METHOD AND APPARATUS FOR GENERATING MIXED REALITY ENVIRONMENT USING DRONE EQUIPPED WITH STEREO CAMERA

(71) Applicant: INDUSTRY ACADEMY COOPERATION FOUNDATION OF SEJONG UNIVERSITY, Seoul (KR)

(72) Inventors: Soo Mi Choi, Seoul (KR); Dong Hyun Kim, Seoul (KR); Yong Guk Go, Namyangju-si (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 16/708,622

(22) Filed: Dec. 10, 2019

(30) Foreign Application Priority Data

Nov. 6, 2019 (KR) ........................ 10-2019-0140673

(51) Int. Cl.
| | | |
|---|---|---|
| *G06K 9/00* | (2006.01) | |
| *G06F 3/01* | (2006.01) | |
| *H04N 7/18* | (2006.01) | |
| *G06T 7/593* | (2017.01) | |
| *G02B 27/01* | (2006.01) | |
| *G06F 3/0481* | (2013.01) | |
| *G06T 19/20* | (2011.01) | |
| *G06T 19/00* | (2011.01) | |

(52) U.S. Cl.
CPC ............ *G06F 3/011* (2013.01); *G02B 27/017* (2013.01); *G06F 3/04815* (2013.01); *G06T 7/593* (2017.01); *G06T 19/006* (2013.01); *G06T 19/20* (2013.01); *H04N 7/181* (2013.01); *G02B 2027/014* (2013.01)

(58) Field of Classification Search
None
See application file for complete search history.

(56) References Cited

U.S. PATENT DOCUMENTS

| | | | | |
|---|---|---|---|---|
| 2019/0197709 A1* | 6/2019 | Windmark | ............... | G06T 7/248 |
| 2019/0306434 A1* | 10/2019 | Annau | ................... | G06T 19/006 |
| 2019/0311546 A1* | 10/2019 | Tay | ........................ | G01S 13/931 |

* cited by examiner

*Primary Examiner* — Atiba O Fitzpatrick

(57) ABSTRACT

Disclosed are a method and an apparatus for generating a mixed reality environment using a drone equipped with a stereo camera including a processor and a memory connected to the processor, wherein the memory stores program commands executed by the process to receive an image acquired by a stereo camera equipped with a drone and a depth value, identify an object from the image, convert a 2D central point coordinate of the identified object to a 3D coordinate through 3D mapping using the depth value, linear-interpolate a 3D coordinate of the object using a 3D coordinate of the object in a previous frame, a 3D coordinate of the object in a current frame, and a weight value, determine a position of a virtual object in association with the linear-interpolated 3D coordinate of the object, and render a mixed reality image including the virtual object.

7 Claims, 5 Drawing Sheets

METHOD AND APPARATUS FOR GENERATING MIXED REALITY ENVIRONMENT USING DRONE EQUIPPED WITH STEREO CAMERA

CROSS-REFERENCE TO RELATED APPLICATION

This application claims under 35 U.S.C. § 119(a) the benefit of Korean Patent Application No. 10-2019-0140673 filed on Nov. 6, 2019, the entire contents of which are incorporated herein by reference.

BACKGROUND

(a) Technical Field

The present disclosure relates to a method and an apparatus for generating a mixed reality environment using a drone equipped with a stereo camera.

(b) Background Art

Recently, a drone is equipped with a camera to easily photograph a place where humans are difficult to directly photograph and thus has been actively researched in various fields such as movies, disasters, building designs, and entertainments.

A commercial drone is controlled by the sight of the third person or first person, that is, the drone. The third person's sight is difficult to estimate a location and a direction of the drone for neighboring objects to avoid obstacles.

The reason is that a 3D view of the human is limited to a range of less than 90 m and an effective range is very small. More advanced drone control may be remotely performed using first person view (FPV) goggles having a resolution from VGA (640×480) to WVGA (800×600) and a limited view of 35° to 43°. Such a system includes FatShark and Skyzone. These systems may transmit a video feed with an analog signal to the ground from the camera of the drone, but have a low transmission speed, a fast speed due to degradation of reception, and a limited view due to middle obstacles.

Currently, drone racing players depend on distance estimation depending on the experience with these technical limitations. However, non-professionals other than the players should consider the avoidance of conflicts with obstacles and surrounding safety.

According to experiments of a remote robot control field, an FPV operation using a stereo camera generates an error less than that using a mono image. From these motives, there is a need for a method of using a more advanced technique (a wide viewing angle, image quality, etc.) and providing an air-mixed reality environment in which a virtual graphic object is mixed to a real drone flight environment to promote a real sense and to consider the safety of an airframe from the impact.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure has been made in an effort to solve the above-described problems associated with prior art and to provide a method and an apparatus for generating a mixed reality environment using a drone equipped with a stereo camera capable of doubling user's interests by providing a virtual object using a stereo camera equipped with a drone.

In order to achieve the object described above, according to an aspect of the present disclosure, there is provided an apparatus for generating a mixed reality environment including a processor and a memory connected to the processor, wherein the memory stores program commands executed by the process to receive an image acquired by a stereo camera equipped with a drone and a depth value, identify an object from the image, convert a 2D central point coordinate of the identified object to a 3D coordinate through 3D mapping using the depth value, linear-interpolate a 3D coordinate of the object using a 3D coordinate of the object in a previous frame, a 3D coordinate of the object in a current frame, and a weight value, determine a position of a virtual object in association with the linear-interpolated 3D coordinate of the object, and render a mixed reality image including the virtual object.

The 2D central point coordinate of the identified object may be converted using a size of the image acquired by the stereo camera and a size of a plane to be rendered.

A correction value for the linear-interpolation may be determined according to the following Equation.

$$F(V_f) = (1-\delta)V_{f-1} + \delta V \quad \text{[Equation]}$$

Here, $\delta$ represents a weight value, $V_{f-1}$ represents a 3D coordinate of the object in the previous frame, $V_f$ represents a 3D coordinate of the object in the current frame, and $F(V_F)$ represents a correction value of the 3D coordinate of the object in the current frame.

The weight value for the linear-interpolation may be determined by a time taken from the previous frame to the current frame and at least one of a traveling speed and a rotational speed of the drone.

A weight value for the linear-interpolation may be determined according to the following Equation.

$$\delta = \frac{1}{fps} * \alpha \quad \text{[Equation]}$$

Here, $f_{ps}$ represents a time taken from the previous frame to the current frame, and $\alpha$ represents an angular velocity and has a range of $1 < \alpha < 2$.

According to another aspect of the present disclosure, there is provided a method for generating a mixed reality environment in an apparatus including a processor and a memory connected to the processor, the method including: receiving an image acquired by a stereo camera equipped with a drone and a depth value; identifying an object from the image; converting a 2D central point coordinate of the identified object to a 3D coordinate through 3D mapping using the depth value; linear-interpolating a 3D coordinate of the object using a 3D coordinate of the object in a previous frame, a 3D coordinate of the object in a current frame, and a weight value; determining a position of a virtual object in association with the linear-interpolated 3D coordinate of the object; and rendering a mixed reality image including the virtual object.

According to yet another aspect of the present disclosure, there is provided a program stored in a recording medium for performing the method.

According to the present disclosure, it is possible to generate a natural mixed reality environment using a virtual object 3D position interpolation method of errors that occur with a latency, errors, etc. of an object identification system.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Figure 1:
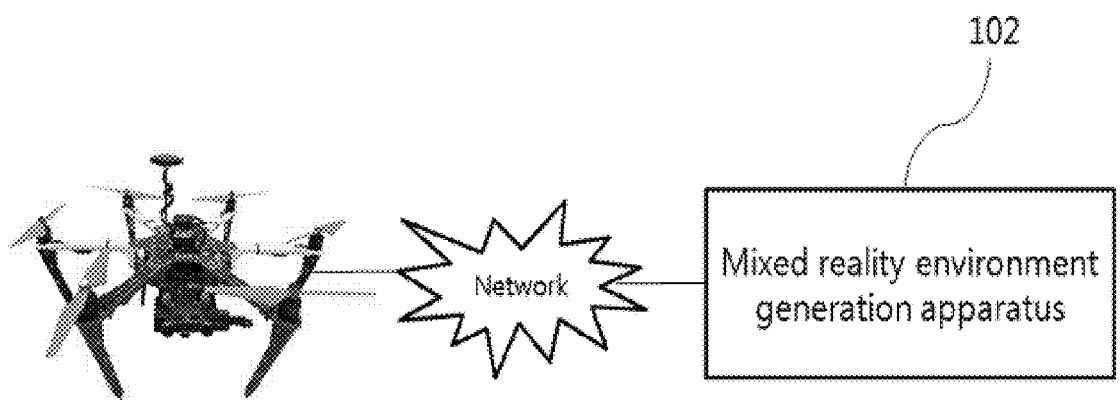
FIG. 1 is a diagram illustrating a configuration of a system for generating a mixed reality environment according to a preferred embodiment of the present disclosure.

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure may have various modifications and various embodiments and specific embodiments will be illustrated in the drawings and described in detail.

However, this does not limit the present disclosure to specific exemplary embodiments, and it should be understood that the present disclosure covers all the modifications, equivalents and replacements included within the idea and technical scope of the present disclosure.

FIG. 1 is a diagram illustrating a configuration of a system for generating a mixed reality environment according to a preferred embodiment of the present disclosure.

As illustrated in FIG. 1, a system according to the present embodiment may include a drone 100 equipped with a stereo camera and a mixed reality environment generation apparatus 102.

The drone 100 and the mixed reality environment generation apparatus 102 may be connected to each other via a radio network.

While the drone 100 flies at predetermined traveling speed and rotational speed according to a user's operation, the drone 100 acquires a front image and a depth value of the image by a stereo camera.

The mixed reality environment generation apparatus 102 identifies an object in the image using the image photographed by the stereo camera and calculates a coordinate of a central point of the identified object.

The mixed reality environment generation apparatus 102 performs 3D mapping using the coordinate of the central point of the identified object and the depth value acquired by the stereo camera, determines a position of a virtual object associated with the identified object, and generates a mixed reality including the virtual object.

Figure 2:
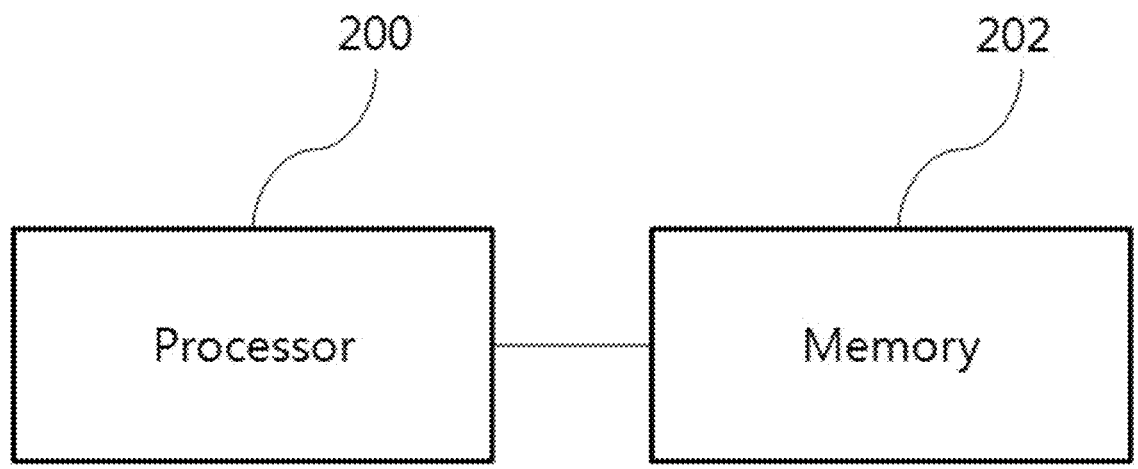
FIG. 2 is a diagram illustrating a detailed configuration of an apparatus for providing a mixed reality according to a preferred embodiment of the present disclosure.

FIG. 2 is a diagram illustrating a detailed configuration of an apparatus for providing a mixed reality according to a preferred embodiment of the present disclosure.

As illustrated in FIG. 2, the apparatus for providing the mixed reality may include a processor 200 and a memory 202.

The processor 200 may include a central processing unit (CPU) capable of executing a computer program or other virtual machines.

The memory 202 may include a nonvolatile storage device such as a fixed hard drive or a detachable storage device. The detachable storage device may include a compact flash unit, a USB memory stick, etc. The memory may also include volatile memories such as various types of random access memories.

According to an embodiment of the present disclosure, in the memory 202, program commands for generating the mixed reality environment are stored, and a configuration to be described below may be a software module that functionally divides configurations implemented by the program commands.

Figure 3:
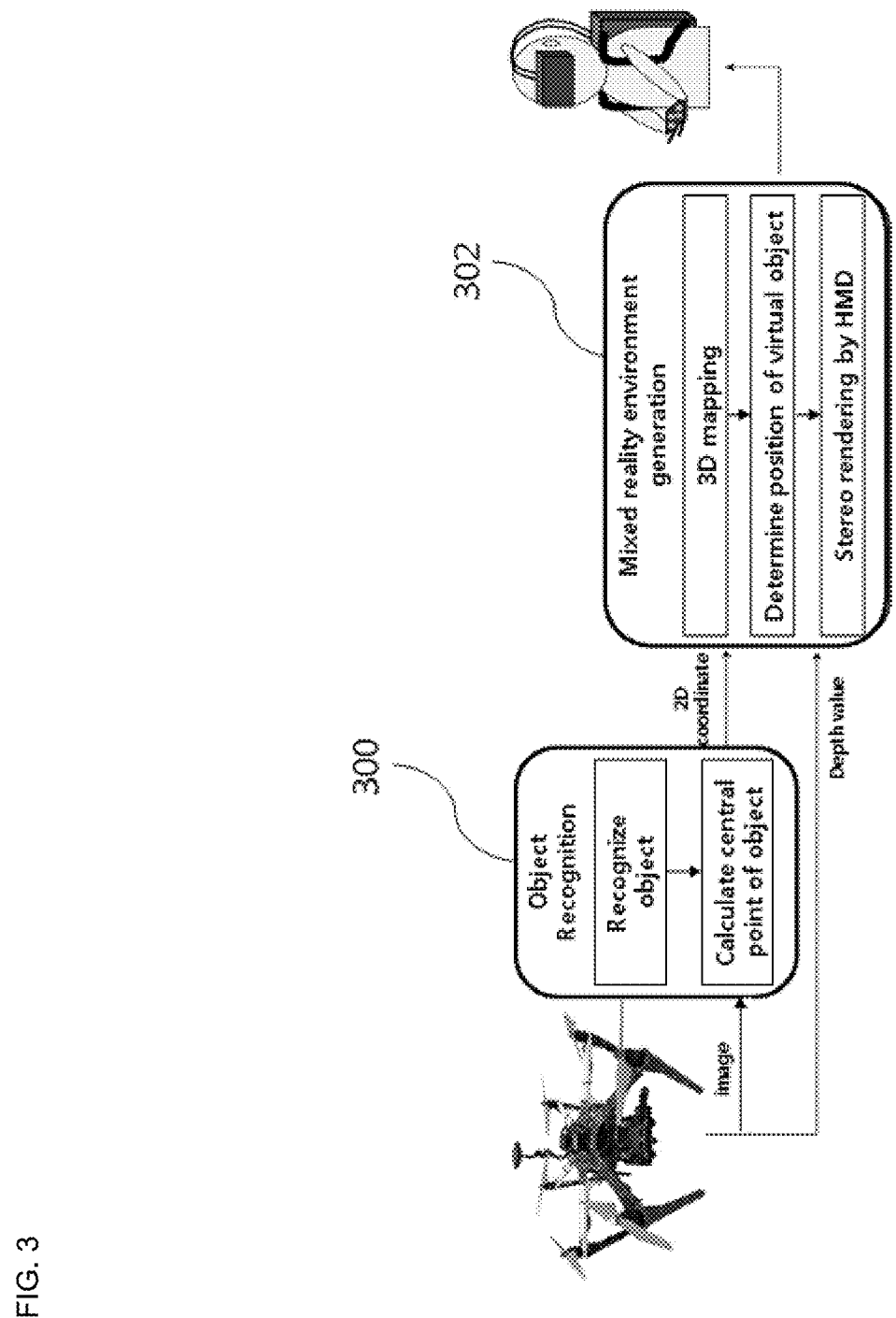
FIG. 3 is a diagram illustrating a configuration of a software module for generating the mixed reality environment according to the embodiment.

FIG. 3 is a diagram illustrating a configuration of a software module for generating the mixed reality environment according to the embodiment.

As illustrated in FIG. 3, a software module according to the present embodiment may include an object recognition module 300 and a mixed reality environment generation module 302.

The object recognition module 300 identifies an object using the image photographed by the stereo camera and calculates a central point of the identified object.

The central point may be calculated using a start point and an end point of a 2D coordinate of the identified object in a 2D image.

Here, the central point of the identified object has a 2D coordinate.

The object recognition module 300 may perform object identification through a deep learning technique. According to the present embodiment, the object recognition module 300 performs the object identification by transfer-learning Faster R-CNN.

In order to render the acquired image by a head-mounted display (HMD), a converting process to a size of a plane to be rendered from a size of the image acquired from the stereo camera through the following Equation 1 is performed.

$$(x',y') = ((p(x \cdot y))/w) \qquad \text{[Equation 1]}$$

At this time, x and y represent coordinates of the central point of the identified object, p represents a size of the plane to be rendered, and ω represents a size of the image acquired from the camera.

The coordinates (x, y) of the central point of the object are converted to x' and y'.

The mixed reality environment generation module 302 performs 3D mapping for calculating virtual reality coordinate values by back-projection conversion to a 3D space in a current projection plane using the converted 2D coordinate and the depth value acquired from the stereo camera.

Next, the mixed reality environment generation module 302 properly moves the virtual object in x-axial and y-axial directions through the 3D mapping, so that the real object and the virtual object do not overlap with each other on the 3D coordinate.

That is, in the present disclosure, the virtual object is generated to correspond to the identified real object on the 2D image, and rendered on the screen by determining a position thereof.

In this case, a moving distance is determined by the size of the virtual object to be generated.

According to a preferred embodiment of the present disclosure, the mixed reality environment generation module 302 linearly interpolates a 3D position of the object by considering latency, noise, etc. which occur in a series of processes of calculating the 2D coordinate of the object acquired from the 2D image to an input value of the 3D coordinate.

A final back-projection converted 3D coordinate value is updated according to the following Equation 2 whenever the object identification is performed.

$$F(V_f) = (1-\delta)V_{f-1} + \delta V \qquad \text{[Equation 2]}$$

Here, $\delta$ represents the number of frames rendered for 1 second as a time taken from a previous frame to a current frame and is defined as the following weight value.

$$\delta = \frac{1}{fps} \qquad \text{[Equation 3]}$$

Here, $f_{ps}$ represents a time taken from the previous frame to the current frame.

For example, $\delta$ becomes 1/30 when 30 frames are rendered for 1 second.

$\delta$ is a value that varies in real-time depending on the complexity of the screen, the hardware performance, etc.

For example, when the complex screen is input and the hardware performance is deteriorated, 30 frames or less per second may be input, and when the screen is relatively simple and the hardware performance is good, 60 frames or more per second may be input.

$V_{f-1}$ represents a 3D coordinate of the object in the previous frame, $V_f$ represents a 3D coordinate of the object in the current frame, and $F(V_F)$ represents a correction value of the 3D coordinate of the object in the current frame.

When new object identification occurs, the value of $V_f$ is the same. For example, when the object identification is performed in the 30th and 60th frames, $V_{30}$ to $V_{59}$ have the same values.

For example, when the $\delta$ value is 1/30, $$F(V_f) = \left(\frac{29}{30} \cdot V_{f-1}\right) - \left(\frac{1}{30} \cdot V_f\right),$$

and thus even though the 3D coordinate value $V_f$ of the object in the current frame is detected as an inaccurate value, the correction is performed by considering the 3D coordinate value $V_{f-1}$ of the object of the previous frame to reduce the inaccuracy of the 3D coordinate value of the object.

According to a preferred embodiment of the present disclosure, a weight value may be determined by reflecting the traveling speed or the rotational speed of the drone.

As the traveling speed or the rotational speed of the drone is increased, a position value of the detected object is relatively rapidly changed, and thus it is necessary to increase a weigh value to be multiplied to the 3D coordinate value $V_f$ of the current object in proportion to at least one of the traveling speed and the rotational speed of the drone.

The weight value considering the traveling speed or the rotational speed of the drone is defined as follows:

$$\delta = \frac{1}{fps} * \alpha \qquad \text{[Equation 4]}$$

Here, $\alpha$ represents an angular velocity, and has a range of $1 < \alpha < 2$. $\alpha$ is determined as follows:

$$\alpha = \frac{d\theta}{dt} + 1 \qquad \text{[Equation 5]}$$

That is, according to the present embodiment, the angular velocity means an angular variation over time, a reference of a time variation is set to 1 second, and a maximum value of the angular variation is limited to 180.

Through the identification of the real object and the 3D mapping of the real object by the depth value, the virtual object is generated, a position thereof is determined, and the mixed reality including the virtual object is displayed by a HMD worn by the user.

According to the present embodiment, a real scene acquired by the stereo camera equipped with the drone and the virtual scene are synthesized in a mobile PC of the user in real time. The user may feel like flying the drone at a desired place of the user with a first-person view through the HMD.

Figure 4A:
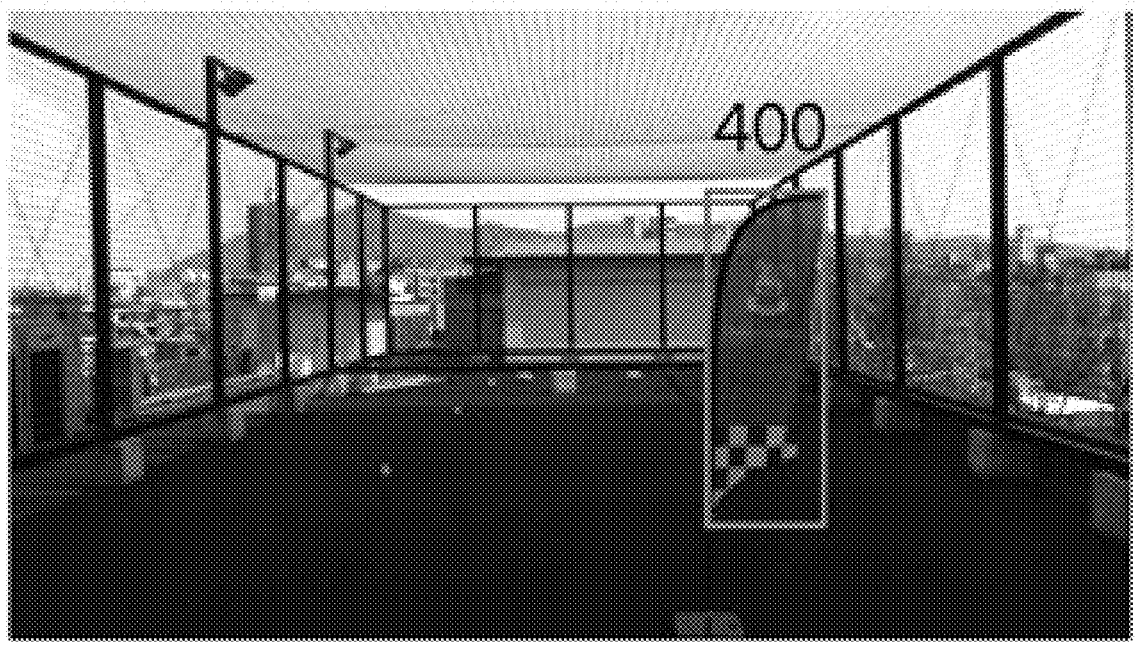
FIGS. 4A and 4B are illustrating an example of generating a virtual object in association with a real object according to an embodiment of the present disclosure.
Figure 4B:
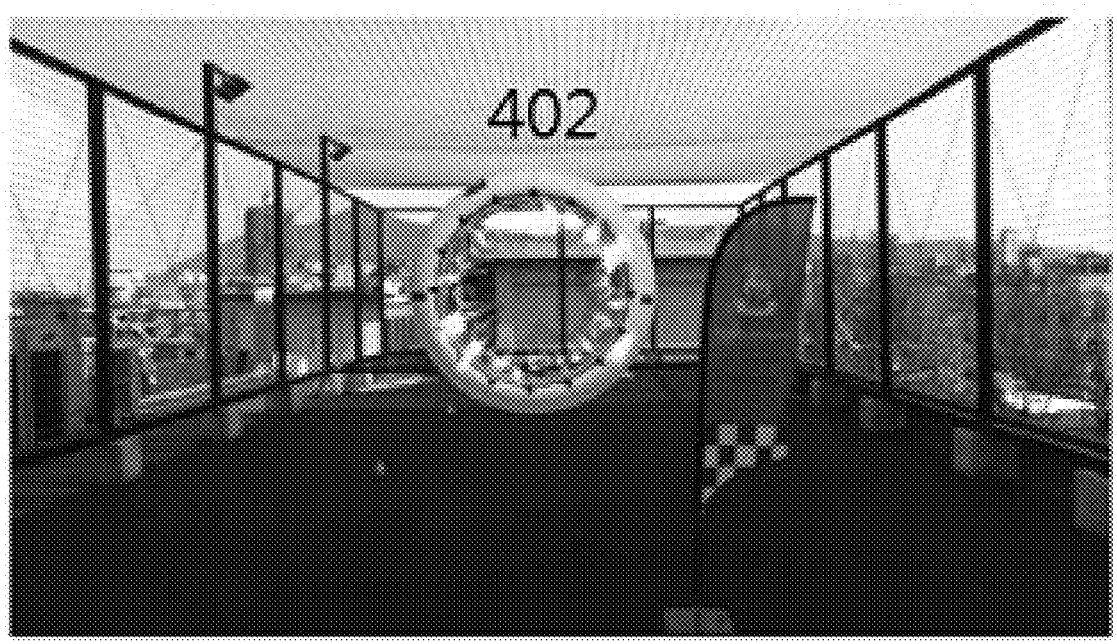

FIGS. 4A and 4B are illustrating an example of generating a virtual object in association with a real object according to an embodiment of the present disclosure.

As illustrated in FIGS. 4A and 4B, the flight environment of the drone may be changed using a drone racing-only flag, etc. That is, a flag 400 is identified and a virtual obstacle 402 in a new form is generated to correspond to a position of the flag to provide an immersive mixed reality environment to the user.

Figure 5A:
FIGS. 5A and 5B are illustrating an example of configuring a forest environment mixed in an open area.
Figure 5B:
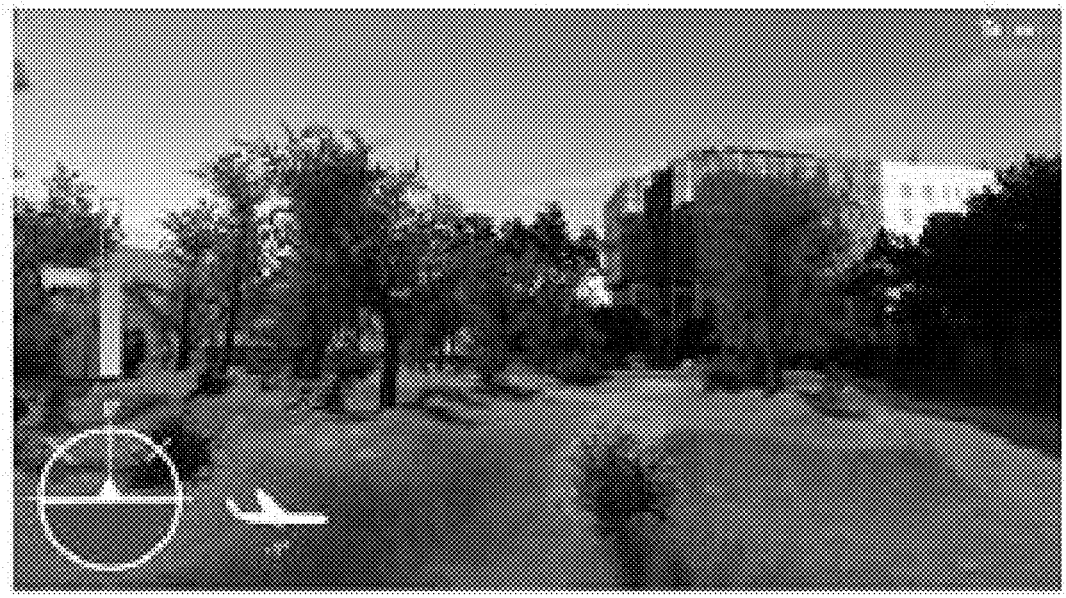

Further, FIGS. 5A and 5B are illustrating an example of configuring a forest environment mixed in an open area. As illustrated in FIGS. 5A and 5B, a forest and trees may be generated in an open area. A mixed reality environment to be generated may be generated by reflecting real-reality objects to be changed in real time to enable various interactions.

It will be apparent to those skilled in the art that various modifications, additions, and substitutions are possible, without departing from the spirit and scope of the present disclosure as defined by the appended claims and the modifications, changes, and additions should be considered as falling within the scope of the following claims.

The disclosure has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for generating a mixed reality environment, comprising:
    a processor; and
    a memory connected to the processor,
    wherein the memory stores program commands executed by the process to receive an image acquired by a stereo camera equipped with a drone and a depth value, identify an object from the image, convert a 2D central point coordinate of the identified object to a 3D coordinate through 3D mapping using the depth value, linear-interpolate a 3D coordinate of the object using a 3D coordinate of the object in a previous frame, a 3D coordinate of the object in a current frame, and a weight value, determine a position of a virtual object in association with the linear-interpolated 3D coordinate of the object, and render a mixed reality image including the virtual object.

2. The apparatus for generating the mixed reality environment of claim 1, wherein the 2D central point coordinate of the identified object is converted using a size of the image acquired by the stereo camera and a size of a plane to be rendered.

3. The apparatus for generating the mixed reality environment of claim 1, wherein a correction value for the linear-interpolation is determined according to the following equation:

$$F(V_f) = (1-\delta)V_{f-1} + \delta V$$

wherein, $\delta$ represents a weight value, $V_{f-1}$ represents a 3D coordinate of the object in the previous frame, $V_f$ represents a 3D coordinate of the object in the current frame, and $F(V_F)$ represents a correction value of the 3D coordinate of the object in the current frame.

4. The apparatus for generating the mixed reality environment of claim 3, wherein the weight value for the linear-interpolation is determined by a time taken from the previous frame to the current frame and at least one of a traveling speed and a rotational speed of the drone.

5. The apparatus for generating the mixed reality environment of claim 4, wherein a weight value for the linear-interpolation is determined according to the following equation:

$$\delta = \frac{1}{fps} * \alpha$$

wherein, $f_{ps}$ represents a time taken from the previous frame to the current frame, and $\alpha$ represents an angular velocity and has a range of $1 < \alpha < 2$.

6. A method for generating a mixed reality environment in an apparatus including a processor and a memory connected to the processor, the method comprising:
receiving an image acquired by a stereo camera equipped with a drone and a depth value;
identifying an object from the image;
converting a 2D central point coordinate of the identified object to a 3D coordinate through 3D mapping using the depth value;
linear-interpolating a 3D coordinate of the object using a 3D coordinate of the object in a previous frame, a 3D coordinate of the object in a current frame, and a weight value;
determining a position of a virtual object in association with the linear-interpolated 3D coordinate of the object; and
rendering a mixed reality image including the virtual object.

7. A program stored in a non-transitory recording medium for performing the method of claim 6.

* * * * *